(12) United States Patent
Keller et al.

(10) Patent No.: US 9,491,668 B2
(45) Date of Patent: Nov. 8, 2016

(54) METHODS OF AND NODES FOR INFORMING A CONTROL NODE IN A SERVING COMMUNICATION NETWORK OF ADDRESS INFORMATION ABOUT A SESSION ANCHOR NODE IN THE SERVING COMMUNICATION NETWORK

(75) Inventors: Ralf Keller, Würselen (DE); Fredrik Lindholm, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 268 days.

(21) Appl. No.: 14/240,094

(22) PCT Filed: Aug. 26, 2011

(86) PCT No.: PCT/EP2011/064714
§ 371 (c)(1),
(2), (4) Date: Feb. 21, 2014

(87) PCT Pub. No.: WO2013/029647
PCT Pub. Date: Mar. 7, 2013

(65) Prior Publication Data
US 2014/0219249 A1    Aug. 7, 2014

(51) Int. Cl.
*H04W 36/00* (2009.01)
*H04W 8/06* (2009.01)
*H04W 8/26* (2009.01)
*H04W 60/04* (2009.01)

(52) U.S. Cl.
CPC ........... *H04W 36/0022* (2013.01); *H04W 8/06* (2013.01); *H04W 8/26* (2013.01); *H04W 60/04* (2013.01)

(58) Field of Classification Search
USPC ........................................ 370/331, 353, 354
See application file for complete search history.

(56) References Cited

U.S. PATENT DOCUMENTS

2007/0153675 A1\* 7/2007 Baglin ................. H04W 48/20
370/216

FOREIGN PATENT DOCUMENTS

WO    WO 2010/055410 A1    5/2010

OTHER PUBLICATIONS

3GPP TS 23.292 3rd Generation Partnership Project, IMS centeralized Service , Jun. 2011.\*
International Search Report, PCT Application No. PCT/EP2011/064714, Oct. 8, 2012.
Written Opinion of the International Searching Authority, PCT Application No. PCT/EP2011/064714, Oct. 8, 2012.

(Continued)

*Primary Examiner* — Pamit Kaur
(74) *Attorney, Agent, or Firm* — Myers Bigel, P.A.

(57) ABSTRACT

A method of informing a control node in a serving communication network of address information about a session anchor node in the serving communication network is described. The control node is accessible by a terminal via a circuit switched access of the serving communication network. The serving communication network of the terminal is different from an internet protocol based home communication network of the terminal. The method is executed by a session anchor node in the home communication network. The method includes receiving an update request for the control node being updated of address information about the session anchor node in the serving communication network, receiving address information about the session anchor node in the serving communication network, and sending the received address information based on the received update request.

20 Claims, 5 Drawing Sheets

(56) References Cited

OTHER PUBLICATIONS

International Preliminary Report on Patentability, PCT Application No. PCT/EP2011/064714, Dec. 11, 2013.

3GPP, Technical Report, "3rd Generation Partnership Project; Technical Specification Group Services and System Aspects; Study on Roaming Architecture for Voice over IMS with Local Breakout; Release 11", 3GPP TR 23.850 V0.2.0 (Sep. 2011), 12 pp.

3GPP, Technical Specification, "3rd Generation Partnership Project; Technical Specification Group Services and System Aspects; IP Multimedia Subsystem (IMS) Service Continuity; Stage 2 (Release 11)", 3GPP TS 23.237 V11.2.0 (Sep. 2011), 154 pp.

3GPP, Technical Specification, "3rd Generation Partnership Project; Technical Specification Group Services and System Aspects; IP Multimedia Subsystem (IMS) centralized services; Stage 2 (Release 11)", 3GPP TS 23.292 V11.0.0 (Jun. 2011), 111 pp.

3GPP, Technical Report, "3rd Generation Partnership Project; Technical Specification Group Services and System Aspects; Feasibility Study of Single Radio Voice Call Continuity (SRVCC) from UTRAN/GERAN to E-UTRAN/HSPA; Stage 2 (Release 11)", 3GPP TR 23.885 V2.0.0 (Aug. 2011), 83 pp.

\* cited by examiner

METHODS OF AND NODES FOR INFORMING A CONTROL NODE IN A SERVING COMMUNICATION NETWORK OF ADDRESS INFORMATION ABOUT A SESSION ANCHOR NODE IN THE SERVING COMMUNICATION NETWORK

CROSS REFERENCE TO RELATED APPLICATION

This application is a 35 U.S.C. §371 national stage application of PCT International Application No. PCT/EP2011/064714, filed on 26 Aug. 2011, the disclosure and content of which is incorporated by reference herein in its entirety. The above-referenced PCT International Application was published in the English language as International Publication No. WO 2013/029647 A1 on 7 Mar. 2013.

TECHNICAL FIELD

The invention relates to telecommunications, in particular to methods of informing a control node in a serving communication network of address information about a session anchor node in the serving communication network, a session anchor node and an intermediate node for informing a control node in a serving communication network of address information about a session anchor node in the serving communication network, a control node for being informed of address information about a session anchor node in the serving communication network, and a program element.

BACKGROUND

Routing signaling data and media data of a session originated by a terminal in a serving or visited communication network to a terminating side may be significantly improved by additionally providing a session anchor node in the visited communication network. In particular, signaling and media data of the session may be routed directly via the session anchor in the visited communication network to the terminating side, and routing the session back to an internet protocol based home communication network of the terminal may be omitted.

A terminal may camp on a circuit switched access of the visited communication network of the above mentioned communication architecture, and may attach to a control node controlling the circuit switched access. For example, the terminal may camp on an UMTS Terrestrial Radio Access Network (UTRAN) or GSM EDGE Radio Access Network (GERAN) radio access network and may attach to a Mobile Switching Center Server (MSC-S) controlling the UTRAN or GERAN radio access network. Further, the terminal may roam between the circuit switched access and a packet switched access or a session of the terminal may be handed over between the circuit switched access and the packet switched access. In the above mentioned example, the terminal may roam or a session of the terminal be handed over between an Evolved UTRAN (E-UTRAN) or Long Term Evolution (LTE) radio access network to the UTRAN access network.

In all cases, the control node has to be informed of the address information of the session anchor node in the visited communication network for routing a session via the session anchor node of the serving communication network. In addition, when roaming or a session handover being executed, the responsible session anchor node in the visited communication network may be different depending on the type of used access. This necessity for being informed of the address information of the session anchor node in the visited communication network may be even enhanced if session voice continuity of a voice session of the terminal may be requested during a session handover between the packet switched access and the circuit switched access.

SUMMARY

It is an object of the invention to provide methods of and nodes for enabling a control node in the serving communication network to route a session via a session anchor node in the serving communication network. Further, it is an object of the present invention to provide a program element enabling such a method.

In order to achieve the objects defined above, methods of informing a control node in a serving communication network of address information about a session anchor node in the serving communication network, a session anchor node and an intermediate node for informing a control node in a serving communication network of address information about a session anchor node in the serving communication network, a control node for being informed of address information about a session anchor node in the serving communication network, and a program element according to the independent claims are provided.

According to an exemplary aspect of the invention, a method of informing a control node in a serving communication network of address information about a session anchor node in the serving communication network is provided. The control node is accessible by a terminal via a circuit switched access of the serving communication network. The serving communication network of the terminal is different from an internet protocol based home communication network of the terminal. The method is executed by a session anchor node in the home communication network. The method comprises receiving an update request for the control node being updated of address information about the session anchor node in the serving communication network, receiving address information about the session anchor node in the serving communication network, and sending the received address information based on the received update request.

According to another exemplary aspect of the invention, a method of informing a control node in a serving communication network of address information about a session anchor node in the serving communication network is provided. The control node is accessible by a terminal via a circuit switched access of the serving communication network. The serving communication network of the terminal is different from an internet protocol based home communication network of the terminal. The method is executed by the control node. The method comprises sending an update request for being updated of address information about the session anchor node in the serving communication network, and receiving information related to the requested address information.

According to another exemplary aspect of the invention, a method of informing a control node in a serving communication network of address information about a session anchor node in the serving communication network is provided. The control node is accessible by a terminal via a circuit switched access of the serving communication network. The serving communication network of the terminal is different from an internet protocol based home communication network of the terminal. The method is executed by an intermediate node in the serving communication network.

The method comprises receiving a packet switched registration request for packet switched registering the terminal in the home communication network, and forwarding the received packet switched registration request together with address information about the session anchor node in the serving communication network.

According to another exemplary aspect of the invention, a session anchor node for informing a control node in a serving communication network of address information about a session anchor node in the serving communication network is provided. The control node is accessible by a terminal via a circuit switched access of the serving communication network. The serving communication network of the terminal is different from an internet protocol based home communication network of the terminal. The session anchor node is in the home communication network. The session anchor node comprises a reception unit configured to receive an update request for the control node being updated of address information about the session anchor node in the serving communication network, another reception unit configured to receive address information about the session anchor node in the serving communication network, and a sending unit configured to send the received address information based on the received update request.

According to another exemplary aspect of the invention, a control node for being informed of address information about a session anchor node in the serving communication network is provided. The control node is accessible by a terminal via a circuit switched access of the serving communication network. The serving communication network of the terminal is different from an internet protocol based home communication network of the terminal. The control node is in the serving communication network. The control node comprises a sending unit configured to send an update request for being updated of address information about the session anchor node in the serving communication network, and a reception unit configured to receive information related to the requested address information.

According to another exemplary aspect of the invention, an intermediate node for informing a control node in a serving communication network of address information about a session anchor node in the serving communication network is provided. The control node is accessible by a terminal via a circuit switched access of the serving communication network. The serving communication network of the terminal is different from an internet protocol based home communication network of the terminal. The intermediate node is in the serving communication network. The intermediate node comprises a reception unit configured to receive a packet switched registration request for packet switched registering the terminal in the home communication network, and a forwarding unit configured to forward the received packet switched registration request together with address information about the session anchor node in the serving communication network.

According to another exemplary aspect of the invention, a program element is provided. The program element, when being executed by a processor, is configured to carry out or control a method of informing a control node in a serving communication network of address information about a session anchor node in the serving communication network as described above.

According to another exemplary aspect of the invention, a computer-readable medium is provided. In the computer-readable medium a computer program for informing a control node in a serving communication network of address information about a session anchor node in the serving communication network is stored. The computer program, when being executed by a processor, is configured to carry out or control a method of informing a control node in a serving communication network of address information about a session anchor node in the serving communication network as described above.

Further embodiments of the methods, the session anchor node, the control node, the intermediate node, the program element, and the computer-readable medium are defined in the dependent claims.

BRIEF DESCRIPTION OF THE DRAWINGS

Embodiments of the invention will be described in more detail hereinafter with reference to examples, but to which the scope of the invention is not limited.

DETAILED DESCRIPTION

Figure 1:
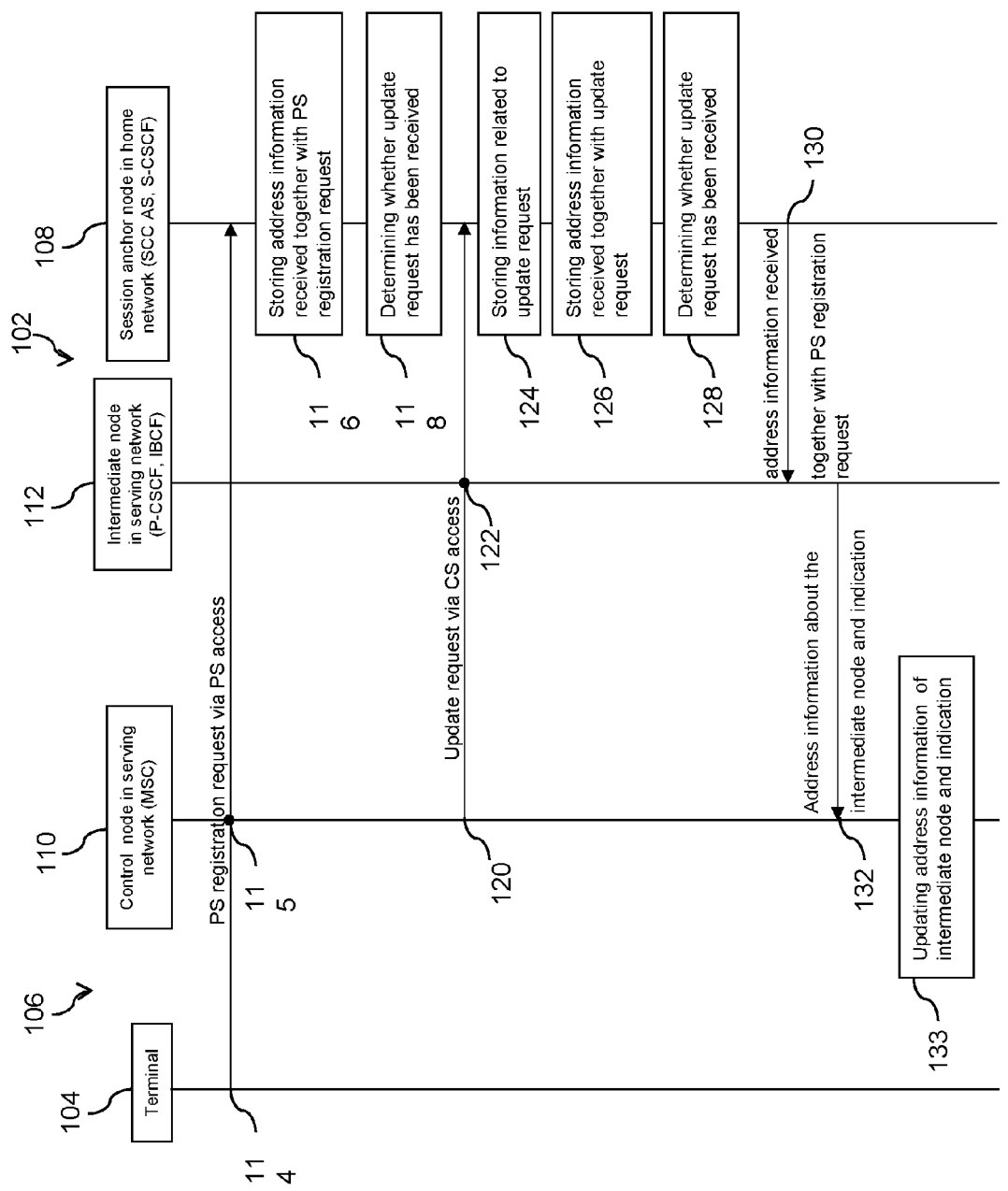
FIG. 1 is a flow diagram illustrating a method of informing a control node in a serving communication network of address information about a session anchor node in the serving communication network according to a first exemplary embodiment of the invention.

The illustration in the drawing is schematic. In different drawings, similar or identical elements are provided with the same reference signs or with reference signs which are different from one another in the first digit.

In the following, methods of informing a control node in a serving communication network of address information about a session anchor node in the serving communication network, a session anchor node and an intermediate node for informing a control node in a serving communication network of address information about a session anchor node in the serving communication network, a control node for being informed of address information about a session anchor node in a serving communication network, a program element, and a computer-readable medium according to exemplary embodiments of the invention will be explained.

A method of informing a control node in a serving communication network of address information about a session anchor node in the serving communication network according to an exemplary embodiment of the invention is described. The control node is accessible by a terminal via a circuit switched access of the serving communication network. The serving communication network of the terminal is different from an internet protocol based home communication network of the terminal. The method is executed by a session anchor node in the home communication network. The method comprises receiving an update request for the control node being updated of address information about the session anchor node in the serving communication network, receiving address information about the session anchor node in the serving communication network, and sending the received address information based on the received update request.

A method of informing a control node in a serving communication network of address information about a session anchor node in the serving communication network according to another exemplary embodiment of the invention is described. The control node is accessible by a terminal via a circuit switched access of the serving communication network. The serving communication network of the terminal is different from an internet protocol based home communication network of the terminal. The method is executed by the control node. The method comprises sending an update request for being updated of address information about the session anchor node in the serving communication network, and receiving information related to the requested address information.

A method of informing a control node in a serving communication network of address information about a session anchor node in the serving communication network according to another exemplary embodiment of the invention is described. The control node is accessible by a terminal via a circuit switched access of the serving communication network. The serving communication network of the terminal is different from an internet protocol based home communication network of the terminal. The method is executed by an intermediate node in the serving communication network. The method comprises receiving a packet switched registration request for packet switched registering the terminal in the home communication network, and forwarding the received packet switched registration request together with address information about the session anchor node in the serving communication network.

A session anchor node for informing a control node in a serving communication network of address information about a session anchor node in the serving communication network according to an exemplary embodiment of the invention is described. The control node is accessible by a terminal via a circuit switched access of the serving communication network. The serving communication network of the terminal is different from an internet protocol based home communication network of the terminal. The session anchor node is in the home communication network. The session anchor node comprises a reception unit configured to receive an update request for the control node being updated of address information about the session anchor node in the serving communication network, another reception unit configured to receive address information about the session anchor node in the serving communication network, and a sending unit configured to send the received address information based on the received update request.

A control node for being informed of address information about a session anchor node in the serving communication network according to an exemplary embodiment of the invention is described. The control node is accessible by a terminal via a circuit switched access of the serving communication network. The serving communication network of the terminal is different from an internet protocol based home communication network of the terminal. The control node is in the serving communication network. The control node comprises a sending unit configured to send an update request for being updated of address information about the session anchor node in the serving communication network, and a reception unit configured to receive information related to the requested address information.

An intermediate node for informing a control node in a serving communication network of address information about a session anchor node in the serving communication network according to an exemplary embodiment of the invention is described. The control node is accessible by a terminal via a circuit switched access of the serving communication network. The serving communication network of the terminal is different from an internet protocol based home communication network of the terminal. The intermediate node is in the serving communication network. The intermediate node comprises a reception unit configured to receive a packet switched registration request for packet switched registering the terminal in the home communication network, and a forwarding unit configured to forward the received packet switched registration request together with address information about the session anchor node in the serving communication network.

A program element according to an exemplary embodiment of the invention is described. The program element, when being executed by a processor, is configured to carry out or control a method of informing a control node in a serving communication network of address information about a session anchor node in the serving communication network as described above.

A computer-readable medium according to an exemplary embodiment of the invention is described. In the computer-readable medium, a computer program for informing a control node in a serving communication network of address information about a session anchor node in the serving communication network is stored. The computer program, when being executed by a processor, is configured to carry out or control a method of informing a control node in a serving communication network of address information about a session anchor node in the serving communication network as described above.

Within the context of the present application, the term "session anchor node" may particularly denote an anchoring functionality and/or entity in a communication network via which signaling and/or media data of a session may have to be routed independent of a session transfer during a handover of a terminal. In particular, the session anchor node may execute routing decisions for routing a session towards the terminating side.

The term "session anchor node in the serving communication network" may particularly denote an anchoring functionality and/or entity in the serving communication network via which a session originated in the serving communication network may be routed to a terminating side. The session anchor node may be configured as a stand-alone functionality of or may be co-located with another node in the serving communication network, for example an intermediate node. In particular, the session anchor node in the serving communication network may be configured as a Visited Session Control Function (V-CSCF) particularly according to 3rd Generation Partnership Project (3GPP) TR 23.850, as available at the filing date of the present invention.

The term "control node in the serving communication network" may particularly denote a functionality and/or an entity controlling a circuit switched access of the serving communication network.

The term "intermediate node of a communication network" may particularly denote any functionality and/or entity in the communication network in a signaling path between an originating side and the session anchor node in the home communication network.

The term "the serving communication network is different from the home communication network" may particularly denote that the serving communication network may be distinct from the home communication network and may represent a visited communication network.

According to the exemplary embodiments, the methods may enable to route a session via a session anchor node in the serving communication network, for example, during a handover between a packet switched access and a circuit switched access (in both directions) or in a case in which a terminal may have roamed prior to a session establishment. In particular, the method may be usable in conjunction with session voice continuity allowing to hand over a voice session anchored in the internet protocol based home communication network between the packet switched access and the circuit switched access. To this end, the control node may request an update of address information about the session anchor node in the serving communication network from the session anchor node in the home communication network, and accordingly may receive the requested information. In turn, the session anchor node in the home communication network may be informed about the requested address information in that the session anchor node in the home communication network may receive the respective address information by an intermediate node in the serving communication network associated with the packet switched access and being aware of the address information.

In particular, the informing of the control node may be dynamically executed depending on changes in the communication architecture of the serving communication network. Further, processing and storage capacity of the control node may be designed to be low, since the control node may, for example, not need to comprise a list about various address information of session anchor nodes in the serving communication network, and, accordingly, the control node may not have to correctly determine, based on the list, the session anchor node in the serving communication network which may be also used by an intermediate node via which the terminal may be packet switched registered.

Next, further exemplary embodiments of the method executed by the session anchor node in the home communication network will be explained. However, these embodiments also apply to the other methods, the session anchor node in the home communication network, the control node, the intermediate node, the program element, and the computer-readable medium.

The update request may be received together with a circuit switched registration request for circuit switched registering the control node in the home communication network or may be received together with a subscription request for the control node subscribing to being updated of the address information. To this end, conventional registering procedures and subscribing procedures may be employed. In particular, a subscription request together with the update request may be received in a case in which the update request may have not been sent together with the circuit switched registering request. In particular, the circuit switched registration request may be initiated by the control node on behalf of the terminal and/or may be executed in accordance with 3GPP TS 23.292, as available at the filing date of the present invention. In particular, the received circuit switched registration request may be received from an intermediate node in the form of a third party registration request. Accordingly, already when the terminal may attach to the control node, the control node may request the update of the address information to be prepared for a session routing of a session originated by the terminal via the session anchor node.

The receiving of the update request may comprise receiving the update request together with address information of a session anchor node in the serving communication network. In particular, the address information received together with the update request may represent address information associated with the circuit switched access and being known and sent by either the control node or an intermediate node of the serving communication network and/or may be regarded as default address information. In particular, the address information may be different from the address information sent by the session anchor node in the home communication network. For example, the terminal may be attached to a control node which may be aware or may be informed of address information of a session anchor node in the serving communication network. Later, the terminal may attach via a packet switched access to the session anchor node in the home communication network, and may then return to the circuit switched access. The control node may send valid address information to the session anchor node in the home communication network, however, this address information may be wrong with respect to the packet switched access. Accordingly, the session anchor node in the home communication network may be informed about a routing path in the serving communication network associated with the circuit switched access.

The method may further comprise receiving, via a packet switched access of the serving communication network, a packet switched registration request for packet switched registering the subscriber of the terminal in the home communication network together with the address information of the session anchor node in the serving communication network. In particular, the packet switched registration request may be mediated by control nodes and/or intermediate nodes between an originating side of the packet switched registration request and the session anchor node in the home communication network. In particular, one of the control nodes and/or intermediate nodes of the serving communication network which may be aware of the address information of the session anchor node in the serving communication network may include the address information of the latter in the packet switched registration request, in order to inform the session anchor node in the home communication network of the address information. Thus, an efficient information transfer between the nodes being aware of the address information and the session anchor node in the home communication network may be enabled.

The packet switched registration request may be received from the terminal. In particular, the packet switched registration request may be sent by the terminal via a Gm interface and/or may comprise a third party registration request sent from an intermediate node in the home communication network to the session anchor node in the home communication network.

The method may further comprise determining, subsequent to the reception of the packet switched registration request, whether an update request has been received, wherein the sending of the received address information may comprise sending the received address information based on a result of the determining. In particular, in a case in which the determining may be in the affirmative, the sending of the received address information may be executed. Further, in a case in which the determining may not be in the affirmative, the sending of the received address information may be omitted. Thus, the efficiency of the method may be improved, since any further actions of the session anchor node in the home communication network related to the requested address information may be only executed if the requested address information may be already available by the session anchor node in the home communication network.

In particular, the session anchor node in the home communication network may determine, subsequent to the above mentioned determination, which node may have sent the update request such that the address information may be correctly routed to the requesting node.

The packet switched registration request may be received prior to the update request, wherein the sending of the received address information may comprise sending the address information received together with the packet switched registration request, and may be executed upon reception of the packet switched registration request. Thus, the latter measure may ensure that the correct address information may be sent, namely the address information received together with the packet switched access of the terminal. Further, the sending of the address information may be executed instantly or immediately upon reception of the packet switched registration request such that a time consumption of the method may be reduced. In particular, the address information may be sent without prior determining whether an update request has been received and/or from which node the update request has been received.

The update request may be received prior to the packet switched registration request, wherein the sending of the received address information may comprise sending the address information received together with the packet switched registration request. Here, a determination step whether an update request has been received and/or from which node may be executed for the sending of the correct address information.

The update request may be received prior to the packet switched registration request, wherein the method may further comprise receiving, subsequent to the update request and via the packet switched access, at least another packet switched registration request for packet switched registering the subscriber of the terminal in the home communication network together with address information of a session anchor node in the serving communication network, and selecting address information from the address information received together with the update request, the packet switched registration request and the another packet switched registration request, wherein the sending of the received address information may comprise sending the selected address information. The selecting may be based on a predefined selection rule. For example, in a case in which the packet switched registration requests may be received at large time distances, the session anchor node in the home communication network may always send the address information received together with the last packet switched registering request. Further, in a case in which the packet switched registration requests may be received immediately subsequent to the circuit switched registration request and almost simultaneously, the session anchor node in the home communication network may sent, if received, the address information received together with the update request or the address information received together with the first packet switched registration request. Accordingly, the method may be versatile applicable, for example, in multi-packet switched registration scenarios of the terminal.

In particular, in a case in which the packet switched registration request and at least another packet switched registration request may have been received by the session anchor node in the home communication network prior to the update request, the session anchor node may send the address information received together with the first packet switched registration request.

In particular, prior to the selecting, the session anchor node may determine whether the address information received together with the packet switched registration request and the at least another packet switched registration request may be different from one another, wherein the selecting may be only executed, if the determination may be in the affirmative. In a case in which the determination may not be in the affirmative, the session anchor node may send the address information received together with any one of the packet switched registration request and the at least another packet switched registration request.

The sending of the received address information may comprise sending the received address information to an intermediate node in the serving communication network for the informing of the control node of the address information. In particular, the control node may be informed by the intermediate node of the address information of the session anchor node in the serving communication network by receiving information related to the requested address information. In particular, the information related to the address information may be the address information or may comprise the address information of the intermediate node and an indication that the intermediate node may be aware of the address information.

The sending of the received address information may comprise sending a notification request for notifying the control node about the received address information. In particular, the notification request may be transferred between the session anchor node in the home communication network and an intermediate node in the serving communication network and optionally the control node such that the informing of the control node may be accomplished.

The sending of the received address information may comprise including the received address information in a Session Initiation Protocol (SIP) message, particularly in a SIP MESSAGE message, a SIP INFO message or in a NOTIFY message. In particular, in a case in which the update request has been received together with the circuit switched registration request, either the SIP MESSAGE message or the SIP INFO message may be sent. In particular, the NOTIFY message may be sent in a case in which the update request has been received together with the subscription request. Accordingly, various conventional procedures may be employed for sending the address information, thereby facilitating the execution of the method.

At least one of the update request and the notification request is transparent for an intermediate node of the serving communication network and/or an intermediate node of the home communication network and/or an intermediate node or proxy interconnecting the serving communication network and the home communication network. Thus, efficiency of the information exchange between the control node, the intermediate node(s) and the session anchor node in the home communication network may be improved in that determining steps of the latter nodes whether or not to forward the update request and/or the notification request may be omitted.

Next, further exemplary embodiments of the method executed by the control node in the serving communication network will be explained. However, these embodiments also apply to the other methods, the session anchor node in the home communication network, the control node, the intermediate node, the program element, and the computer-readable medium.

In particular, the circuit switched registration request may be sent from a control node via an I2 interface.

The sending of the update request may comprise sending the update request together with address information about a session anchor node in the serving communication network. Accordingly, in a case in which the call control node may be aware of any address information about a session anchor node in the serving communication network, the control node may provide this address information to the session anchor node in the home communication network such that the session anchor node may consider these information for routing decisions.

The method may further comprise updating the information related to the address information of the session anchor node in the serving communication network based on the received information related to the address information for a session establishment of a session from the terminal towards a terminating side. Here, the term "update information" may particularly denote an exchange of present information by new (identical or different) information or may denote making the new information available without the latter mentioned present information existing. In particular, the method may form part of a session establishment or may be executed prior to the session establishment. Thus, the control node may be enabled to route a session via the session anchor node in a case a terminal may be attaching to the control node, in a case the terminal may roam between a packet switched access and a circuit switched access or in a case of a terminal handover between the latter mentioned accesses leading to a session transfer.

In particular, the update request, the address information, the information related to the address information, the circuit switched registration request, the (at least another) packet switched registration request, the subscription request and/or the notification request may be send in one message between the respective communication partners or may be send using multiple messages along the information and/or request transfer path with each message of the multiple messages being sent between different nodes involved in the information and/or request transfer path between the communication partners. For example, a message comprising the update request may be split in more messages, and each of these messages may be transferred between different nodes along the update request transfer path.

Next, further exemplary embodiments of the session anchor node in the home communication network, the control node and the intermediate node will be explained. However, these embodiments also apply to the methods, the respective two other nodes of the latter three nodes, the program element, and the computer-readable medium.

The session anchor node may be configured as a Serving Call Service Control Function (S-CSCF) or an application server, particularly a Service Centralization and Continuity Application Server (SCC AS) or a Telephony Application Server (TAS). Accordingly, the session anchor node which may be responsible for routing decisions of sessions may be associated with already existing functionalities such that the informing of the control node may be facilitated.

The control node may be configured as a Mobile Switching Center Server (MSC-S) particularly according to 3GPP TS 23.292, clause 7.2.1, as available at the filing date of the present invention.

The intermediate node may be configured as a Proxy Call Session Control Function (P-CSCF), an Access Transfer Control Function (ATCF) or an Interconnection Border Control Function (IBCF). In particular, these functions may form part of an Internet Protocol based communication network and are thus participating in session routing between the terminal and a terminating side. Accordingly, the intermediate node may be aware of the address information of the session anchor node in the serving communication network.

In particular, the home communication network may be configured as an Internet Protocol (IP)-based Multimedia Services (IMS) communication network. A circuit switched access may be configured as an UTRAN/GERAN radio access network. A packet switched access may be configured as an E-UTRAN or LTE radio access network.

In particular, in case of the above mentioned exemplary network architecture and a session transfer employing Single Radio Voice Call Continuity in the return direction (rSRVCC, namely from a circuit switched access to a packet switched access particularly in accordance with 3GPP 23.216, as available at the filing date of the present invention), the control node embodied as a MSC-S may receive the address information of the intermediate node embodied as an ATCF during circuit switched registering in the IMS home communication network. Accordingly, the ATCF may be in the session path. Accordingly, the method may inform the MSC-C about the address information of the session anchor node, the V-CSCF, in the serving communication network by providing the ATCF and/or another intermediate node configured as an IBCF with address information about the V-CSCF. Accordingly, the ATCF and/or the IBCF may stay in the session path after a transfer of the session. If, for example, the terminal may roam within one country (for example, within provinces of China) and no IBCF may be employed for the session routing, the ATCF may be only provided with the address information about the V-CSCF.

In particular, in case of the above mentioned exemplary network architecture and a session transfer not employing rSRVCC, the ATCF may be not be necessarily in the session path, and the MSC-S or the IBCF, if present, may be informed of the address information of the V-CSCF using the method.

The intermediate node may be co-located with the session anchor node in the serving communication network. Alternatively, the intermediate node and the session anchor node in the serving communicated network may represent stand-alone entities and/or functionalities.

Referring to FIG. 1, a method of informing a control node in a serving communication network of address information about a session anchor node in the serving communication network will be explained. A communication system associated with the method comprises an internet protocol based home communication network 102 configured as an IMS based communication network in which a terminal 104 is registered and a serving or visited communication network 106 of the terminal 104. The serving communication network 106 is distinct from the home communication network 102. During an execution of the method, the terminal 104 is located in the serving communication network 106. The home communication network 102 comprises at least a session anchor node 108 configured as an SCC AS. Alternatively, the session anchor node 108 is configured as a S-CSCF. The serving communication network 106 comprises at least a control node 110 configured as a MSC-S and being accessible by the terminal 104 via a circuit switched access, and an intermediate node 112 configured as a P-CSCF. Alternatively, the intermediate node 112 is configured as an IBCF. A session anchor node in the serving communication network 106 is configured as a V-CSCF.

In a first step 114 of the method, the terminal 104 sends a packet switched (PS) registration request for packet switched registering the terminal 104 in the home communication network 102 to the session anchor node 108 in the home communication network 102 via a packet switched access of the serving communication network 106. As indicated by a circle 115, the intermediate node 112 adds address information of the session anchor node in the serving communication network 106 to the packet switched registration request. Upon reception of the packet switched registration request, the session anchor node 108 stores in a step 116 the address information received in the step 114. In a step 118, the session anchor node 108 determines whether an update request has been received from any node in the serving communication network 106 and, depending whether the determination is in the affirmative, which node has sent the update request. Since no update request has been received, the determination of the step 118 is not in the affirmative, and the session anchor node 108 does not execute any further actions.

In a step 120, the control node 110 sends on behalf of the terminal 104 an update request via a circuit switched (CS) access to the session anchor node 108 in the home communication network 102. To this end, the terminal 104 has sent a respective circuit switched registering request to the control node 110. As indicated by a circle 122, the intermediate node 112 adds default address information about a session anchor node in the serving communication network 106 to the update request when forwarding the update request to the session anchor node 101. The address information sent in the steps 114 and 120 are different from one another. Alternatively, another intermediate node of the serving communication network 106 being distinct from the intermediate node 112 adds the default address information to the circuit switched registration request. Upon reception of the update request, the session anchor node 108 stores in a step 124 information related to the received update request. In a step 126, the session anchor node 108 then stores the default address information received together with the update request.

In a step 128, the session anchor node 108 again determines whether an update request has been received from the control node 110 and which node has sent the received update request. Since the update request has been received in the step 120 by the control node 110, the determination of the step 128 is in the affirmative and the control node 110 has been identified to be the node requesting the update. The session anchor node 108 then sends in a step 130 the address information received in the step 114 and stored in the step 116 to the intermediate node 112 along with a notification request for notifying the control node 110 about the address information of the session anchor node in the serving communication network 106.

Upon reception of the notification request, the intermediate node 112 sends its own address information to the control node 110 in a step 132 and a respective indication indicating that the intermediate node 112 is aware of the correct address information about the session anchor node in the serving communication network 106, in order to implicitly inform the control node 110 about the address information of the session anchor node in the serving communication network. The control node 110 updates in a step 133 the address information of the intermediate node 112 and the received indication for the updating of the address information of the session anchor node in the serving communication network 106.

Accordingly, the control node 110 is enabled to later on route a session originated by the terminal 104 to a terminating side via the session anchor node in the serving communication network 106 and not from the session anchor node 108 in the home communication network 102.

Figure 2:
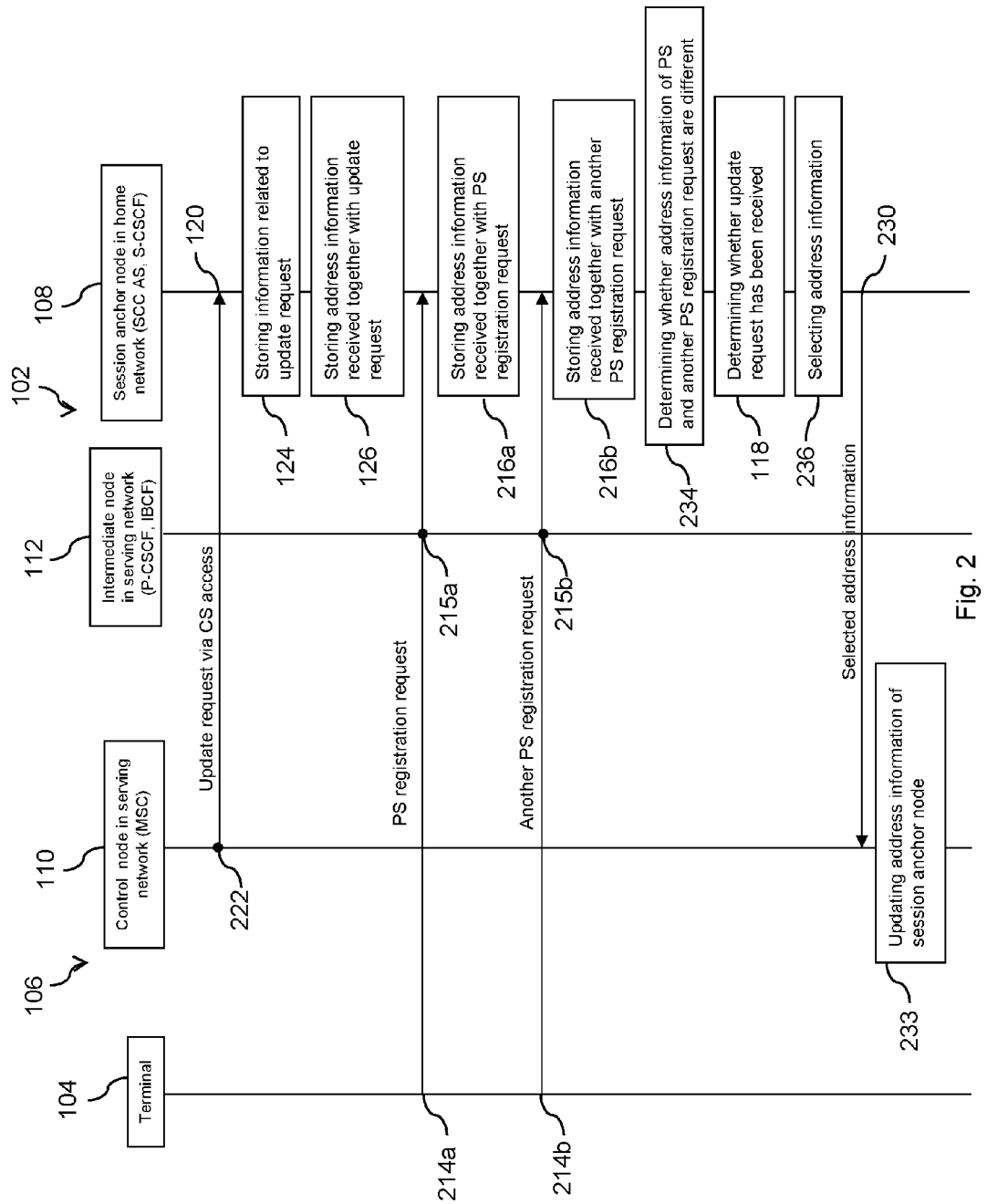
FIG. 2 is a flow diagram illustrating a method of informing a control node in a serving communication network of address information about a session anchor node in the serving communication network according to a second exemplary embodiment of the invention.

Referring to FIG. 2, a method of informing a control node in a serving communication network of address information about a session anchor node in the serving communication network according to a second exemplary embodiment of the invention will be explained. The communication system associated with the method is identical to the communication system of FIG. 1.

First, steps 120-126 are executed which are identical to the steps 120-126 of FIG. 1. However, as indicated by a circle 222, default address information about a session anchor node in the serving communication network 106 is added by the control node 110 to the circuit switched registration request.

Later, a packet switched registration request is sent in a step 214a from the terminal 104 to the session anchor node 108 in the home communication network 102 via a packet switched access. The address information sent in the steps 120 and 214a are different from another. As indicated by a circle 215a, the intermediate node 112 adds the address information about the session anchor node in the serving communication network 106 to the packet switched registration request. In a step 216a, the received address information is stored by the session anchor node 108 in the home communication network 108. In a step 214b, the terminal 104 sends another packet switched registration request to the session anchor node 108 via another packet switched access, and, indicated by a circle 215b, the intermediate node 112 adds another, different address information about another session anchor node in the serving communication network 106 to the another packet switched registration request. The address information sent in the step 214b is different from the address information sent in the steps 120 and 214a. The session anchor node 108 again stores the received address information in a step 216b upon reception of the packet switched registration request.

In a next step 218, the session anchor node 108 determines whether an update request has been received and, if an update request has been received, which node has sent the update request. Since the update request has been received in the step 120 by the control node 110, the determination of the step 118 is in the affirmative, and the control node 110 is identified. Next, in a step 234, the session anchor node 108 determines whether the address information received together with the packet switched registration request and the another packet switched registration request are different from another. The determination is in the affirmative, and, in a step 236, the session anchor node 108 selects address information to be sent to the control node 110 from the group of the stored address information received together with the update request in the step 120, received together with the packet switched registration request in the step 214a and received together with the another packet switched registration request received in the step 214b. In case the determination of the step 234 is not in the affirmative, the address information received with either the packet switched registration request or the another packet switched registration request is sent to the control node 110. According to a predefined selection rule, the session anchor node 108 selects the address information received together with the first received packet switched registration request, namely the address information received in the step 214a, and sends the selected address information in a step 230 to the control node 110. In a step 233, the control node 108 updates the address information presently stored in the control node 108. The control node 110 is accordingly enabled to execute measures as described with respect to FIG. 1.

Further, the step 120 may be executed by sending a first message comprising the update request from the control node 110 to the intermediate node 112 and a second message comprising the update request from the intermediate node 112 to the session anchor node 108. Further, the step 230 may be executed by sending a first message comprising the address information from the session anchor node 308 to the intermediate node 112 and a second message from the intermediate node 112 to the control node 110. Further, the steps 130 and 132 of FIG. 1 may be executed instead of the step 230.

Figure 3:
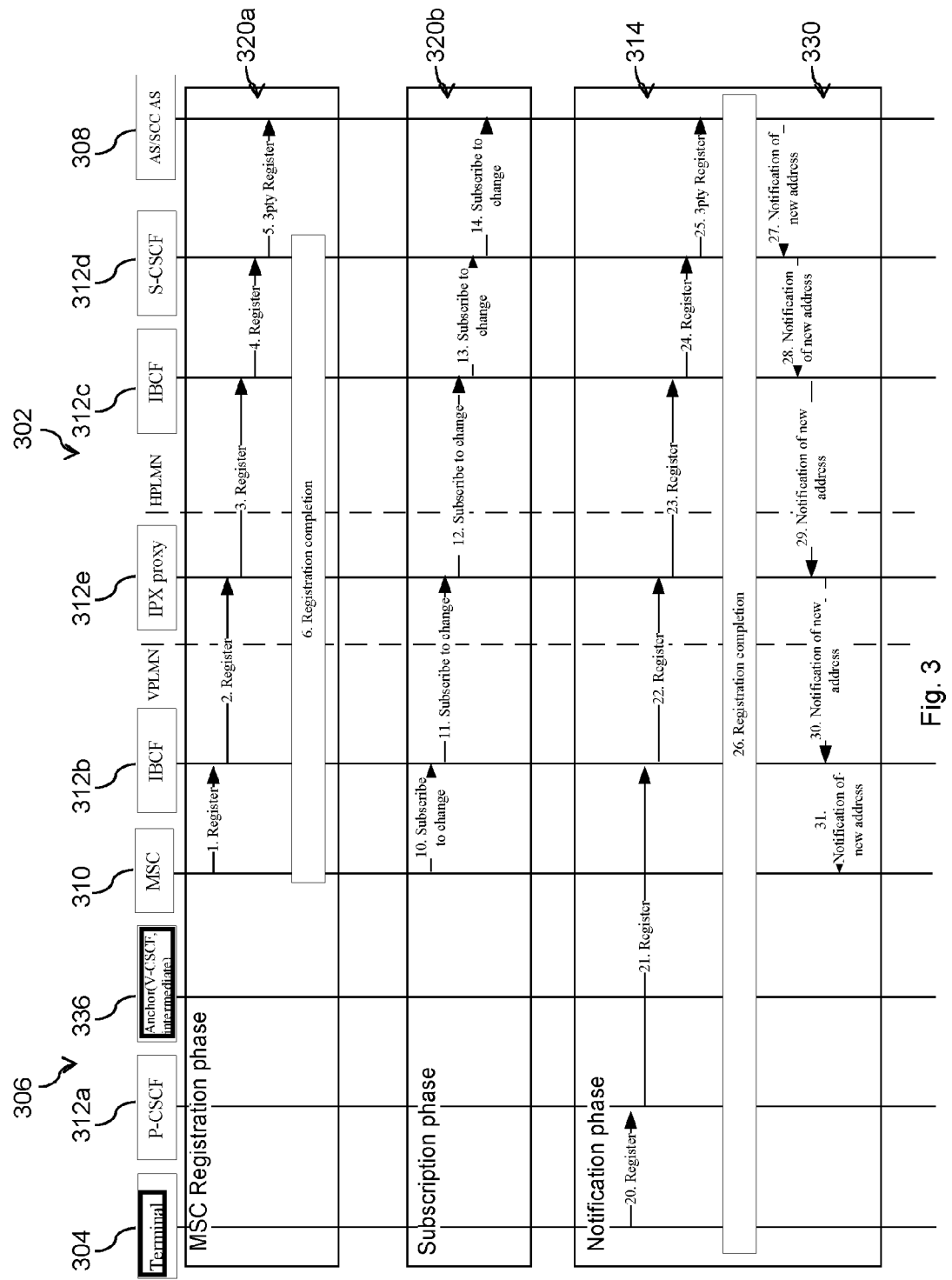
FIG. 3 is a flow diagram illustrating a method of informing a control node in a serving communication network of address information about a session anchor node in the serving communication network according to a third exemplary embodiment of the invention.

Referring to FIG. 3, a method of informing a control node in a serving communication network of address information about a session anchor node in the serving communication network according to a third exemplary embodiment of the invention will be explained. An communication system associated with the method comprises a home communication network 302 in the form of an IMS based Public Land Mobile Network PMLN in which a terminal 104 is registered and which comprises a session anchor node 308 configured as an Application Server, namely as a SCC AS. A serving communication network 306 in the form of a Visited Public Land Mobile Network VPLMN comprises the terminal 304, a control node 310 configured as a MSC-S, intermediate nodes 312a, b configured as a P-CSCF and an IBCF, respectively, and a session anchor node 336 configured as a V-CSCF. Intermediate nodes 312c, d of the HPLMN 302 are configured as an IBCF and a S-CSCF, respectively. One intermediate node 312e configured as an Internet Protocol Exchange IPX proxy interconnects the HPLMN 302 and the VPLMN 306.

In a first step 320a of the method comprising substeps 1-6, a circuit switched registration request for circuit switched registering the MSC-S 310 on behalf of a subscriber of the terminal 304 in the HPLMN 302 is sent from the MSC-S 310 to the SCC AS 308. To this end, the terminal 304 attaches to the MSC-S 310 via a circuit switched access, for example, via an UTRAN radio access network. In the substeps 1-4 of the step 320a, the IBCF 312b, the IPX proxy 312e, and the IBCF 312c route the circuit switched registration request according to conventional procedures. A third party registration request is sent in a substep 5 of the step 320a from the S-CSCF 312d to the SCC AS 308, and in a substep 6 of the step 320a, the registration is completed between the SCC AS 308 and the MSC-S 310 in accordance with convention procedures.

In a step 320b comprising substeps 10-14, an update request for updating (and thus for being notified of any changes of) the address information of the V-CSCF 336 is sent from the MSC-C 310 to the SCC AS 308 using a subscription procedure. The MSC-S 310 indicates support to handle the address information of the V-CSCF 336 by sending a respective indication in the sent subscription request. In the substeps 10-14, the IBCF 312b, the IPX proxy 312e, and the IBCF 312c route the subscription request according to conventional procedures. Further, the IBCF 312b includes in the substep 11 default address information of the V-CSCF 336 into the forwarded subscription request. At reception of the update request included in the subscription request, the SCC AS 308 accepts the subscription request and stores information related to the update request.

Alternatively, the update request is sent together with the circuit switched registration request in the step 320a, and the step 320b is omitted.

In a step 314 comprising substeps 20-26, a packet switched registration request is sent from the terminal 304 to the SCC AS 308, since the terminal 308 becomes available on a packet switched access of the serving communication network 106, for example a LTE radio access network, and executes a packet switched IMS registration. This registration is executed in accordance with conventional registration procedures in the substeps 20-26. Further, the P-CSCF 312a in the VPLMN 306 adds the address information of the V-CSCF 336 to the packet switched registration request in the substep 21. Alternatively, the IBCF 312b adds the address information of the V-CSCF 336 to the registration request in the substep 22. The registration request is forwarded by the S-CSCF 321d to the SCC AS 308 in the form of a third party registration request in the substep 25. The SCC AS 308 stores the address information of the V-CSCF 336 as a part of the registration procedure. In a substep 26, the registration procedure is completed according to conventional procedures.

Next, in a step 330 comprising substeps 27-31, the address information of the V-CSCF 336 is sent from the SCC AS 308 to the MSC-S 310. The steps 314 and 330 represent a notification phase of the method. In the substep 27, the SCC AS 308, upon reception of the packet switched IMS registration request from the terminal 304, determines whether any node has requested to be updated with address information of the V-CSCF 336. This determination is similar to the determination of the step 118 of FIG. 1, 2. Since the MSC-S 310 has requested to be updated in the step 320b, the determination is in the affirmative, the MSC-S 310 is identified and a notification request comprising the address information of the V-CSCF 336 received in the substep 25 of the step 314 is sent from the SCC AS 308 to the MSC-S 310 using a NOTIFY message. Alternatively, a SIP MESSAGE or a SIP INFO message comprising the address information is sent, if the update request has been sent along with the circuit switched registration request in the step 320a. The notification request is forwarded to the MSC-S 310 in the substeps 28-31. In the substep 31, upon reception of the new address information of the V-CSCF 336, the MSC-S 310 stores the address information for any subsequent session originations of the subscriber from the MSC-S 310 towards a terminating side.

In a case in which the terminal 304 has sent, similar to the packet switched registration request sent in the step 314, multiple packet switched registration requests subsequent to the circuit switched registration request in the step 320a, the SCC AS 308 may determine between the substeps 26 and 27, whether the address information received together with these packet switched registration requests are different from one another. If the determination is in the affirmative, the SCC AS 308 may select the address information to be sent in the step 330 according to a predetermined selection rule. The SCC AS 308 may select the address information received together with the circuit switched registration request 320a or together with the subscription request in the step 320b, if the address information has been included in the respective requests. Alternatively, the SCC AS 308 may select the address information received together with the first received packet switched registration request 314.

Further, in a case in which the packet switched registration request in step 314 is received prior to the update request of one of the steps 320a, b, the notification request procedure 330 may be executed as soon as the SCC AS 308 may receive the update request in the substeps 5 or 14.

Figure 4:
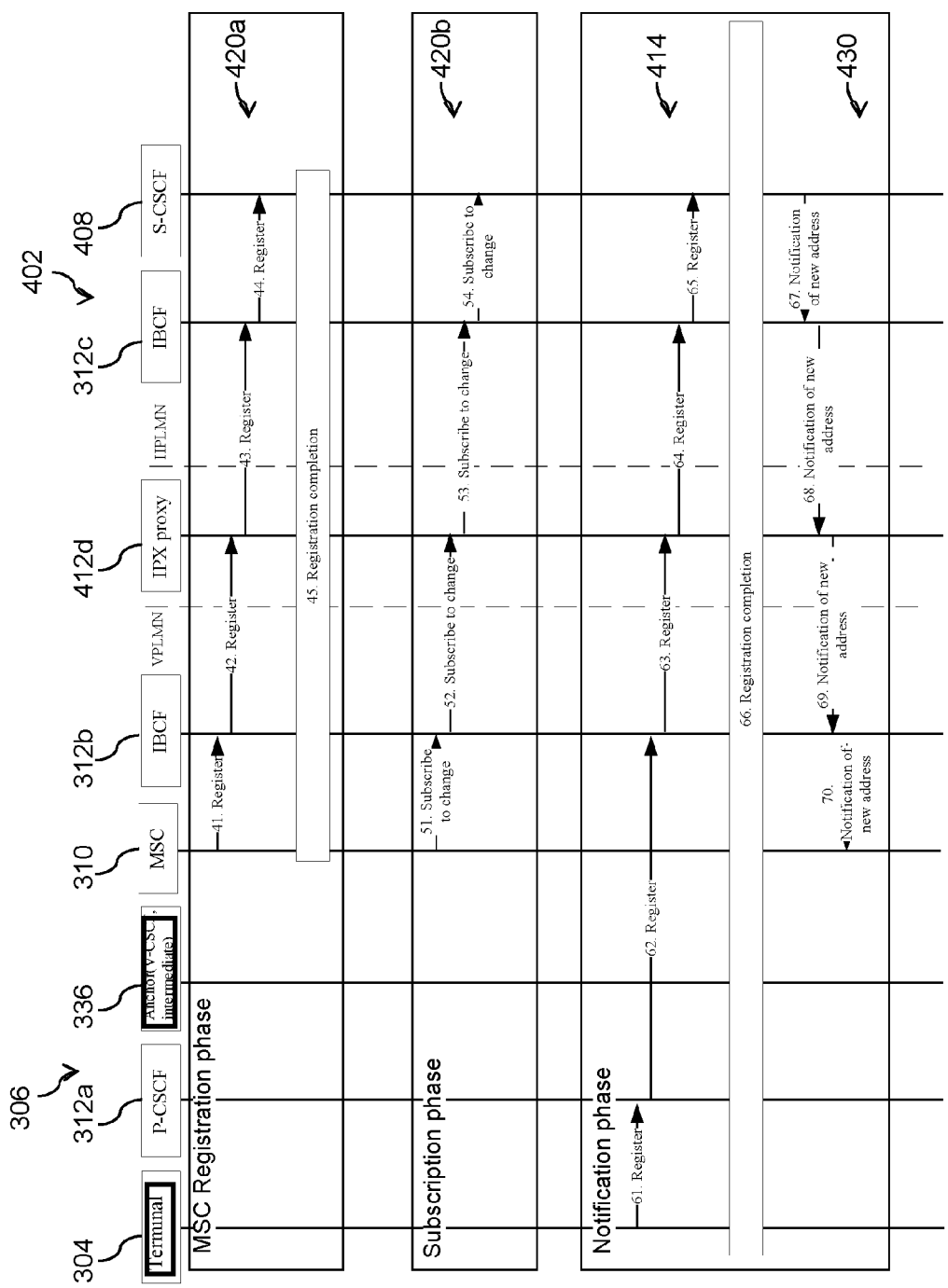
FIG. 4 is a flow diagram illustrating a method of informing a control node in a serving communication network of address information about a session anchor node in the serving communication network according to a fourth exemplary embodiment of the invention.

Referring to FIG. 4, a method of informing a control node in a serving communication network of address information about a session anchor node in the serving communication network according to a fourth exemplary embodiment of the invention will be explained. A communication system associated with the method is similar to the communication system of FIG. 3. However, a S-CSCF represents the session anchor node 408 of a home communication network 402. Accordingly, reference numeral 412d denotes an IPX proxy. Steps 420a, b, 414, 430 are similar to the steps 320a, b, 314, and 330 of FIG. 3, respectively. However, signaling between the S-CSCF 308 and the SCC AS is omitted. For illustration purposes, substeps 1-31 of FIG. 3 have been renamed to be substeps 41-70. Corresponding substeps of FIGS. 3 and 4 are similarly executed.

Figure 5:
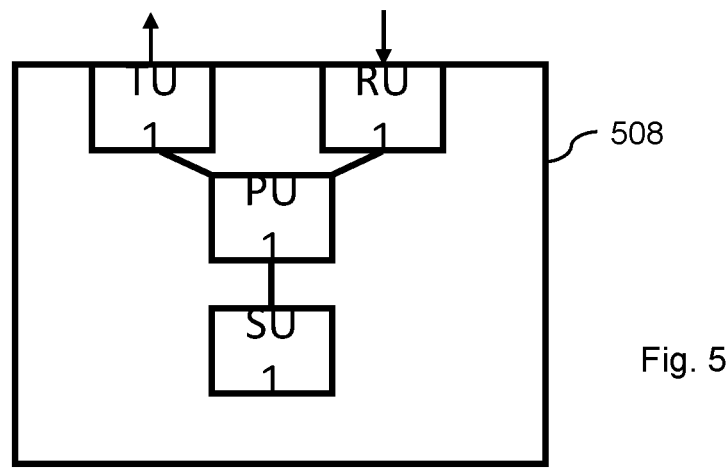
FIG. 5 is a block diagram illustrating a constitution of a session anchor node for informing a control node in a serving communication network of address information about a session anchor node in the serving communication network according to an exemplary embodiment of the invention.

Referring to FIG. 5, a session anchor node 508 for informing a control node in a serving communication network of address information about a session anchor node in the serving communication network according to an exemplary embodiment of the invention is explained. The control node is accessible by a terminal via a circuit switched access of the serving communication network. The serving communication network of the terminal is different from an internet protocol based home communication network of the terminal. The session anchor node 508 is in the home communication network. The session anchor node 508 comprises a reception unit configured to receive an update request for the control node being updated of address information about the session anchor node in the serving communication network, another reception unit configured to receive address information about the session anchor node in the serving communication network, and a sending unit TU1 configured to send the received address information based on the received update request. The reception unit and the another reception unit are portions of a reception unit RU1 of the session anchor node 508. Further, the session anchor node 508 comprises a processing unit PU1 configured to process data or information related to a method of informing a control node in the serving communication network of address information about a session anchor node in the serving communication network as described above. In particular, the processing unit PU1 is configured to determine whether an update request has been received and which node has sent the update request. Further, the session anchor node 308 comprises a storage unit SU1 configured to store data or information related to the above mentioned method, and in particular information related to the received update request. The session anchor node 508 is configured as a TAS.

Alternatively, the portion of the reception unit RU1 being configured to receive the update request may be also configured to receive the address information about the session anchor node in the serving communication network.

Figure 6:
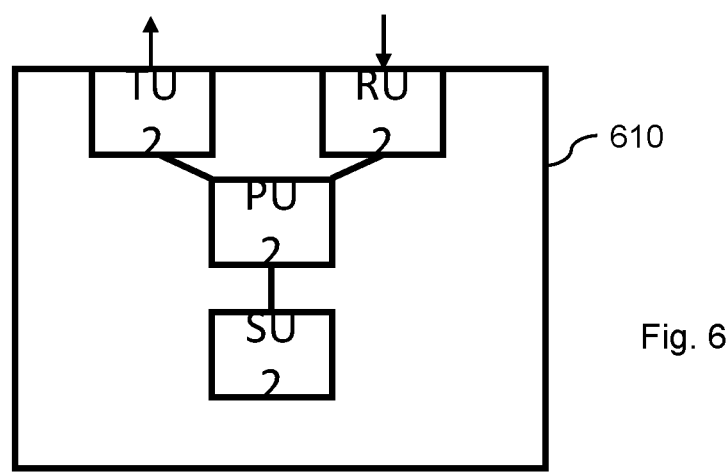
FIG. 6 is a block diagram illustrating a constitution of a control node for being informed of address information about a session anchor node in a serving communication network according to an exemplary embodiment of the invention.

Referring to FIG. 6, a control node 610 for being informed of address information about a session anchor node in the serving communication network according to an exemplary embodiment of the invention is described. The control node 610 is accessible by a terminal via a circuit switched access of the serving communication network. The serving communication network of the terminal is different from an internet protocol based home communication network of the terminal. The control node 610 is in the serving communication network. The control node 610 comprises a sending unit TU2 configured to send an update request for being updated of address information about the session anchor node in the serving communication network, and a reception unit RU2 configured to receive information related to the requested address information. Further, the control node 610 comprises a processing unit PU2 configured to process data or information related to a method of informing a control node in the serving communication network of address information about a session anchor node in the serving communication network as described above, and in particular to update the address information present in the control node upon reception of new address information. Further, the control node comprises a storage unit SU2 configured to store data or information related to the above mentioned method. In particular, the storage unit SU2 is configured to store the received address information. The control node 610 is configured as a MSC-S.

Figure 7:
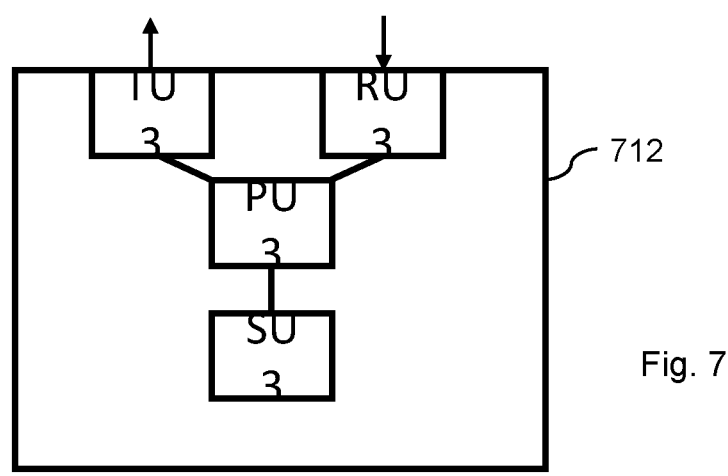
FIG. 7 is a block diagram illustrating a constitution of an intermediate node for informing a control node in a serving communication network of address information about a session anchor node in the serving communication network according to an exemplary embodiment of the invention.

Referring to FIG. 7, an intermediate node 712 for informing a control node in a serving communication network of address information about a session anchor node in the serving communication network according to an exemplary embodiment of the invention is described. The control node is accessible by a terminal via a circuit switched access of the serving communication network. The serving communication network of the terminal is different from an internet protocol based home communication network of the terminal. The intermediate node 712 is in the serving communication network. The intermediate node 712 comprises a reception unit RU3 configured to receive a packet switched registration request for packet switched registering the terminal in the home communication network, and a forwarding unit configured to forward the received packet switched registration request together with address information about the session anchor node in the serving communication network. The forwarding unit form part of a sending unit TU3 configured to send data or information related to a method of informing a control node in the serving communication network of address information about a session anchor node in the serving communication network as described above. Further, the intermediate node 712 comprises a processing unit PU3 configured to process data or information related to the above mentioned method, and a storage unit SU3 configured to store data or information related to the above mentioned method. The intermediate node 312 is configured as a P-CSCF.

It is noted that an association between the described functionalities of the nodes in FIGS. 5 to 7 and the functionality based units of these nodes may be different. For example, the control node 610 may comprise a separate update unit configured to update the address information of the session anchor node in the serving communication network.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the use of indefinite articles "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of informing a control node in a serving communication network of address information about a session anchor node in the serving communication network, wherein the control node is accessible by a terminal via a circuit switched access of the serving communication network, wherein the serving communication network of the terminal is different from an internet protocol based home communication network of the terminal, the method being executed by a session anchor node in the home communication network, the method comprising:
   receiving, from the control node, an update request for the control node being updated of the address information about the session anchor node in the serving communication network,
   receiving the address information about the session anchor node in the serving communication network,
   sending the received address information based on the received update request to the control node, and
   receiving, via a packet switched access of the serving communication network, a packet switched registration request for packet switched registering a subscriber of the terminal in the home communication network together with the address information of the session anchor node in the serving communication network.

2. The method according to claim 1, wherein the update request is received together with a circuit switched registration request for circuit switched registering the control node in the home communication network or is received together with a subscription request for the control node subscribing to being updated of the address information.

3. The method according to claim 1, wherein the receiving of the update request comprises receiving the update request together with the address information of a session anchor node in the serving communication network.

4. The method according to claim 1, wherein the packet switched registration request is received from the terminal.

5. The method according to claim 1, the method further comprising:
   determining, subsequent to the receiving of the packet switched registration request, whether an update request has been received,
wherein the sending of the received address information comprises sending the received address information based on a result of the determining.

6. The method according to claim 1, wherein the packet switched registration request is received prior to the update request, wherein the sending of the received address information comprises sending the address information received together with the packet switched registration request, and is executed upon reception of the packet switched registration request.

7. The method according to claim 6, wherein the sending of the received address information comprises sending the received address information to an intermediate node in the serving communication network for the informing of the control node of the address information.

8. The method according to claim 1, wherein the update request is received prior to the packet switched registration request, wherein the sending of the received address information comprises sending the address information received together with the packet switched registration request.

9. The method according to claim 1, wherein the update request is received prior to the packet switched registration request, the method further comprising:
   receiving, subsequent to the update request and via the packet switched access, at least another packet switched registration request for packet switched registering the subscriber of the terminal in the home communication network together with address information of a session anchor node in the serving communication network, and
   selecting address information from the address information received together with the update request, the packet switched registration request and the another packet switched registration request,
wherein the sending of the received address information comprises sending the selected address information.

10. The method according to claim 1, wherein the sending of the received address information comprises sending a notification request for notifying the control node about the received address information.

11. The method according to claim 1, wherein the sending of the received address information comprises including the received address information in a SIP MESSAGE, a SIP INFO message or a NOTIFY message.

12. The method according to claim 1, wherein at least one of the update request and the notification request is transparent for an intermediate node of the serving communication network and/or an intermediate node of the home communication network.

13. A session anchor node for informing a control node in a serving communication network of address information about the session anchor node in the serving communication network, wherein the control node is accessible by a terminal via a circuit switched access of the serving communication network, wherein the serving communication network of the terminal is different from an internet protocol based home communication network of the terminal, the session anchor node being in the home communication network, the session anchor node comprising:
   at least one processor configured to:
   receive, from the control node, an update request for the control node being updated of the address information about the session anchor node in the serving communication network,
   receive the address information about the session anchor node in the serving communication network, and
   send the received address information based on the received update request to the control node,
   receive, via a packet switched access of the serving communication network, a packet switched registration request for packet switched registering a subscriber of the terminal in the home communication network together with the address information of the session anchor node in the serving communication network.

14. The session anchor node according to claim 13, wherein the session anchor node is configured as a Serving Call Service Control Function or an application server, particularly as a Service Centralization and Continuity Application Server or a Telephony Application Server.

15. The session anchor node according to claim 13, wherein the packet switched registration request is received from the terminal.

16. The session anchor node according to claim 13, the at least one processor is further configured to:
    determine, subsequent to the receiving of the packet switched registration request, whether an update request has been received,
    wherein the sending of the received address information comprises sending the received address information based on a result of the determining.

17. The session anchor node according to claim 13, wherein the packet switched registration request is received prior to the update request, wherein the sending of the received address information comprises sending the address information received together with the packet switched registration request, and is executed upon reception of the packet switched registration request.

18. The session anchor node according to claim 17, wherein the sending of the received address information comprises sending the received address information to an intermediate node in the serving communication network for the informing of the control node of the address information.

19. The session anchor node according to claim 13, wherein the update request is received prior to the packet switched registration request, wherein the sending of the received address information comprises sending the address information received together with the packet switched registration request.

20. The session anchor node according to claim 13, wherein the update request is received prior to the packet switched registration request, the at least one processor is further configured to:
    receive, subsequent to the update request and via the packet switched access, at least another packet switched registration request for packet switched registering the subscriber of the terminal in the home communication network together with address information of a session anchor node in the serving communication network, and
    select address information from the address information received together with the update request, the packet switched registration request and the another packet switched registration request,
    wherein the sending of the received address information comprises sending the selected address information.

* * * * *